(No Model.) 3 Sheets—Sheet 1.

P. LANGE.
DYNAMO ELECTRIC MACHINE OR MOTOR.

No. 500,400. Patented June 27, 1893.

WITNESSES: INVENTOR

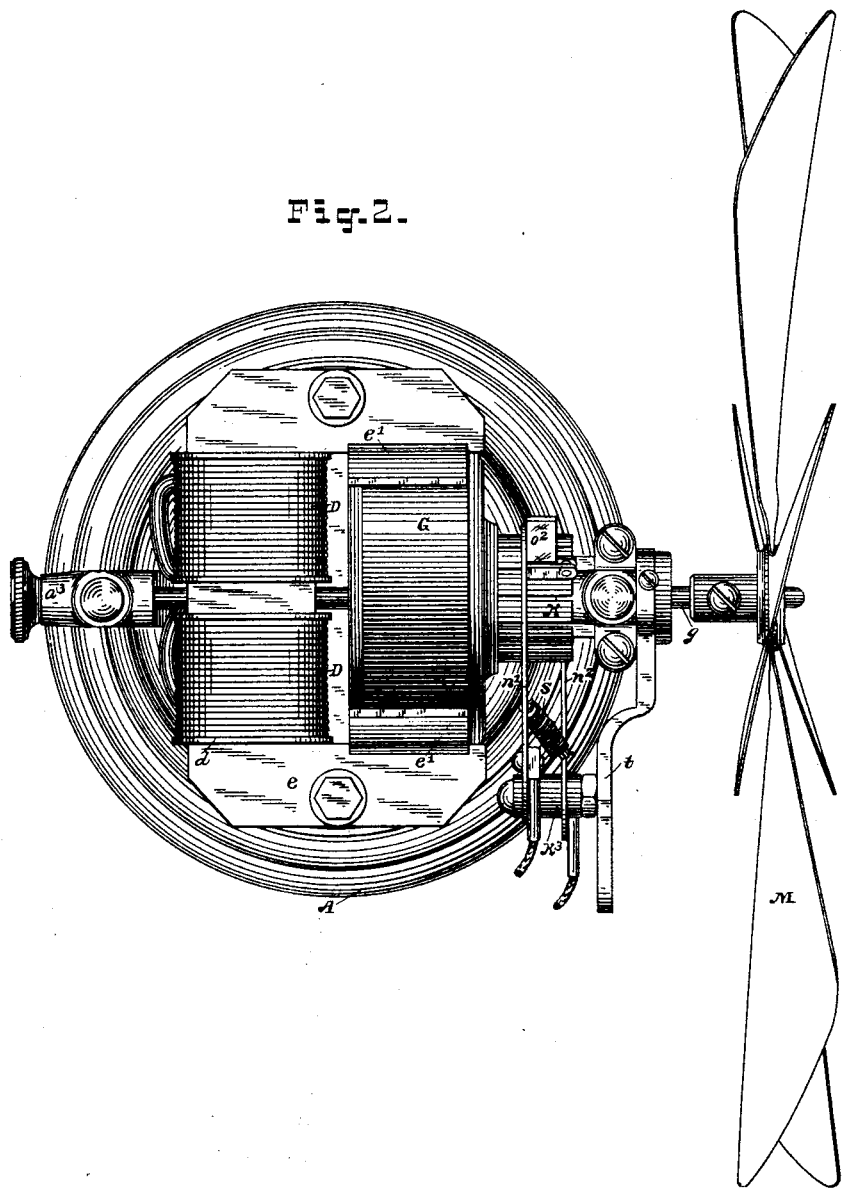

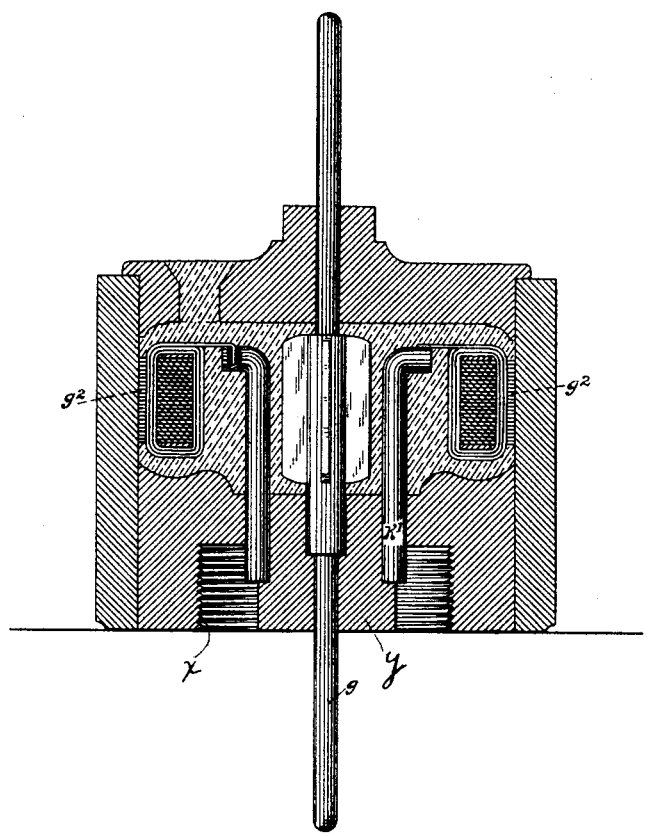

UNITED STATES PATENT OFFICE.

PHILIP LANGE, OF PITTSBURG, PENNSYLVANIA, ASSIGNOR TO THE WESTINGHOUSE ELECTRIC AND MANUFACTURING COMPANY, OF SAME PLACE.

DYNAMO-ELECTRIC MACHINE OR MOTOR.

SPECIFICATION forming part of Letters Patent No. 500,400, dated June 27, 1893

Application filed April 28, 1891. Serial No. 390,735. (No model.)

*To all whom it may concern:*

Be it known that I, PHILIP LANGE, a citizen of the United States, and a resident of Pittsburg, in the county of Allegheny and State of Pennsylvania, have invented certain new and useful Improvements in Dynamo-Electric Machines, (Case No. 454,) of which the following is a specification.

My invention relates to the construction of electric generators and motors and more particularly to that class employed in connection with alternating currents.

While many features of the invention are applicable to various different forms of electric generators and motors, I will describe the invention particularly in connection with alternating current motors employed for driving fans and doing light work.

The invention consists in various improvements in the general construction of the armature, its commutator and brush-holder and arrangement and mounting of the field magnet. These improvements will be described particularly in connection with the accompanying drawings, in which—

Figure 1:
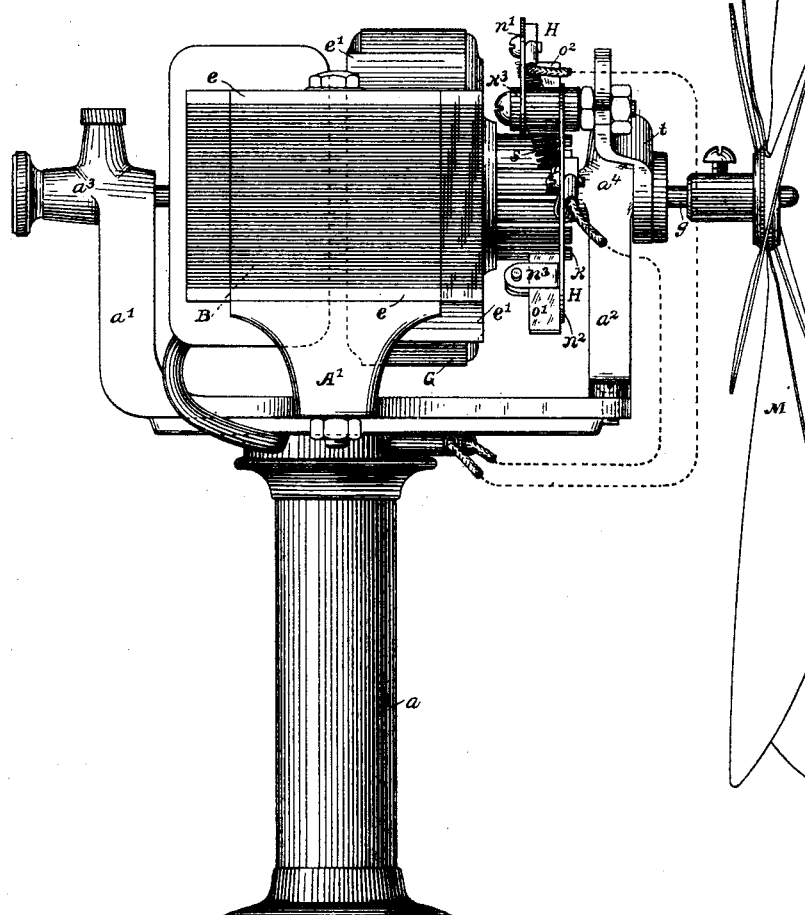
Figure 1:
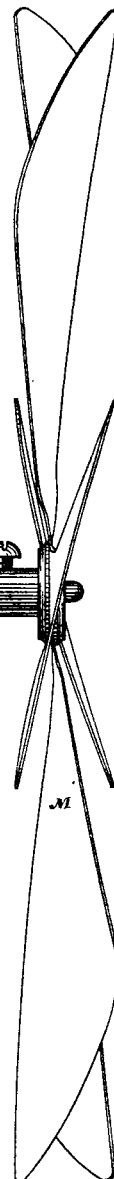

Figure 1 is a side elevation. Fig. 2 is a plan of the motor, and Fig. 3 is a cross-section of the armature and commutator.

Referring to the figures, A represents any suitable stand for supporting the various parts of the motor. It is constructed with a hollow upright or stem $a$ through which the electric conductors 1 and 2 are led to the motor. It carries a bracket A' for supporting the field magnet B; and this bracket is constructed with arms $a'$, $a^2$ for carrying the shaft of the armature. The field-magnet B is constructed in this instance of plates of soft iron stamped to the proper shape and clamped together firmly and held in a bracket or frame. This field magnet is provided with exciting coils D carried upon spools $d$. The field-magnet is faced with small plates $e$ having polar projections $e'$. The armature G is carried upon a shaft $g$ turning in the bearings $a^3$, $a^4$ formed upon or secured by the frame or bracket.

The construction of the armature is as follows: A series of short rods or bars $k$ of copper, brass or other suitable material are supported in a mold in their proper relative positions so that the ends $k'$ may serve to form a commutator when the armature is completed. The upper ends of these bars are shown as being bent outward and the terminals of the armature coils $h$ are secured to them, the entire armature ring surrounding the rods. Any suitable form of armature may be employed and, in case of the ring armature, it may be constructed with or without the teeth $g^2$. The armature-shaft $g$ is also placed in the mold being supported in a suitable opening formed for that purpose. The parts being thus assembled in their proper relative positions, a suitable cement or plaster, such for instance as plaster of paris, is placed in the mold and forced into all the interstices completely embedding all the portions of the armature except the ends of the rods $k$ which are to form the commutator. When this cement or plaster has dried or set, it holds the parts firmly in the proper relative positions and the complete armature is thoroughly protected there being no exposed portions except the commutator. The portion of the armature-shaft which is within the body of the armature is represented as being enlarged, and may be of a square or other suitable cross-section for the purpose of holding it firmly and preventing it from turning in the cement. The rods $k$ may be of any desired shape or cross-section. In the drawings, the ends which are turned outward, serve to prevent them from turning within the armature, but they may be of angular cross-section or otherwise suitably formed for the same purpose. When the armature is removed from the mold, the projecting ends of the bars $k$ may be turned down in any suitable manner to form the commutator. A convenient way to open the mold for removal of the armature is to draw out the follower $y$ by means of any proper tool adapted to screw into the threaded cavity $x$. I do not limit myself, however, to any form of mold. The spaces between the segments of the commutator, may be filled with the plaster or they may be left entirely open, as desired.

The commutator-brushes H are carried in two suitable commutator arms $n'$ and $n^2$, which are respectively provided with clamps $n^3$ for holding the small carbon brushes $o'$ and $o^2$, which I prefer to use. The two arms are carried in insulated supports upon bushings $k^3$ and are pressed against the proper points upon the commutator by means of a spring $s$, having its respective ends attached to the two arms. The support $t$ for the arms $n'$, $n^2$ is pivoted upon the bracket carrying the armature and it may be adjusted about the same for the purpose of regulating the speed and current-consumption of the motor. The shaft of the motor may drive a fan M or perform other suitable work.

I claim as my invention—

1. The combination of a laminated field-magnet, an armature-shaft, and a laminated armature consisting of a core, having a Gramme ring winding and commutator segments connected therewith, said armature and shaft being embedded in a non-conducting material, substantially as described.

2. An armature for electric machines consisting of a core and coils, and commutator segments projecting therefrom, said core and coils and the inner ends of the commutator-segments being embedded in plaster or similar non-conducting material, substantially as described.

3. An armature for electric machines consisting of a core of soft iron and coils applied thereto, a body of non-conducting moldable material, such as plaster or cement, and a shaft supported by said body of cement.

4. The method of building armatures for electric machines which consists in first forming the core and applying the coils and subsequently forming a body for the armature by applying a non-conducting material to it while in a plastic state and subsequently drying the same, substantially as described.

5. An armature for electric machines consisting of the combination of the core formed of plates having projecting teeth, coils wound in the spaces between the teeth, a series of rods of conducting material projecting from the plane of the armature and temporarily held in position with reference to the coils, circuit-connections with said bars, and a filling or body of non-conducting material surrounding and incasing the several parts of the armature, substantially as described.

6. The combination of an armature body made of moldable material, an armature core and coils, an armature shaft, all being embedded in said armature body; and bars partly embedded therein and partly projecting therefrom to form a commutator, substantially as described.

7. A brush holder for electric machines consisting of the support $t$ pivoted to revolve about the shaft of the armature and the arms $n'$, $n^2$, having clamps $n^3$, for receiving the carbon brushes $o'$, $o^2$, said arms being pivoted upon a common bearing on said support, substantially as described.

8. The combination with an armature for electric machines of an armature-shaft passing centrally through the armature, and a body of plaster or cement rigidly uniting the armature-shaft with the armature, substantially as described.

In testimony whereof I have hereunto subscribed my name this 16th day of April, A. D. 1891.

PHILIP LANGE.

Witnesses:
HERMAN FRANZE,
JAMES W. SMITH.